(No Model.)
R. ALLERT.
PROCESS OF SEPARATING YEAST CELLS.
No. 479,130. Patented July 19, 1892.
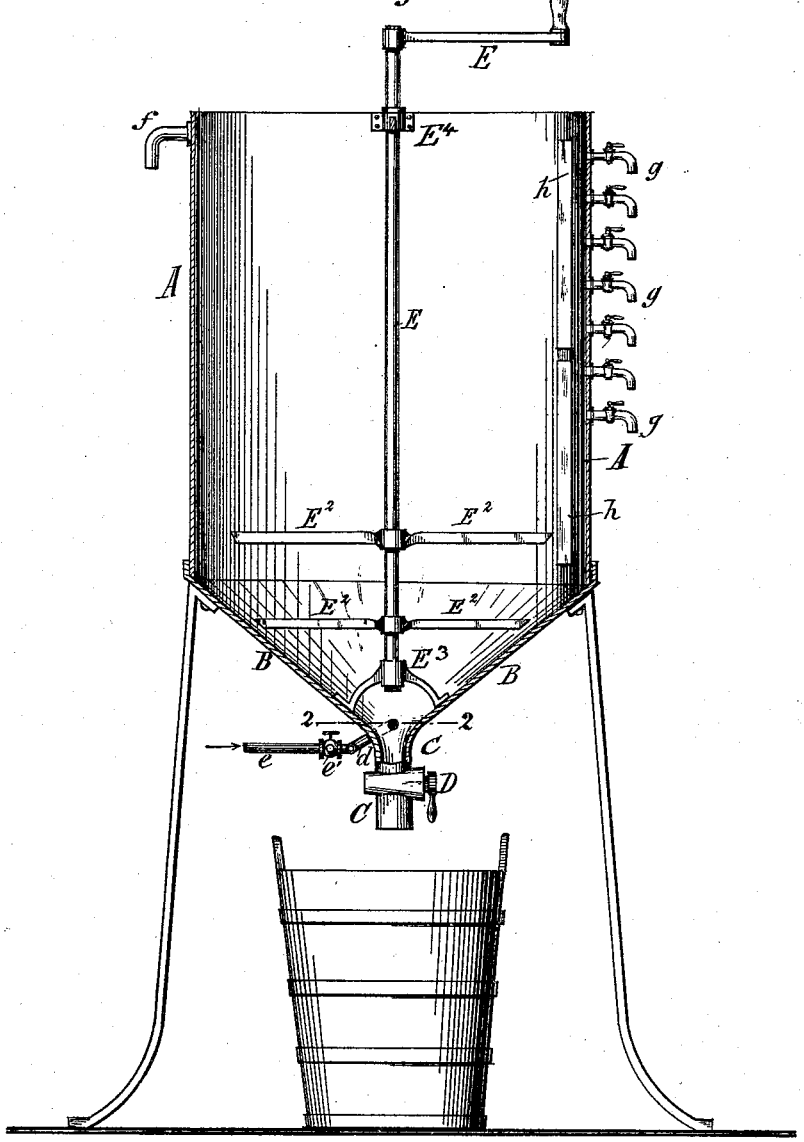
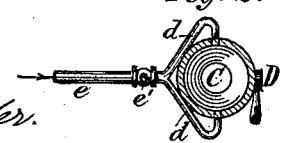

UNITED STATES PATENT OFFICE.

RUDOLF ALLERT, OF NEW YORK, N. Y.

PROCESS OF SEPARATING YEAST-CELLS.

SPECIFICATION forming part of Letters Patent No. 479,130, dated July 19, 1892.

Application filed May 7, 1892. Serial No. 432,143. (No specimens.)

*To all whom it may concern:*

Be it known that I, RUDOLF ALLERT, a subject of the Emperor of Germany, and a resident of New York city, in the county and State of New York, have invented certain new and useful Improvements in Processes of Separating Yeast-Cells, of which the following is a specification.

Brewers' yeast, especially that obtained by bottom fermentation, was heretofore purified by mixing the same with salicylic acid and other chemicals, whereby the bacteria and degenerated yeast-cells were killed by the chemical action of the acid. This chemical treatment of the yeast, however, also attacks the sound yeast-cells and exerts an injurious influence on the same, so that it is necessary to revivify the same by adding a small quantity of sweet wort to the body of yeast under treatment.

The object of this invention is to furnish an improved process by which brewers' yeast is purified by mechanical treatment without the use of chemicals and in such a manner that the bacteria and weak and degenerated yeast-cells are separated from the strong and healthy yeast-cells, and thereby a superior yeast for use in the fermentation of the worts of beer and other malt liquors is obtained.

The invention consists of a process of purifying brewers' yeast, which consists of the following successive steps: first, mixing the body of the yeast with a quantity of water; second, subjecting the liquid to agitation by currents of air forced into the same, so as to oxidize and thereby kill the bacteria, and draw off the bacteria and degenerated yeast-cells; third, permitting the heavier and stronger yeast-cells to settle by subsidence, and, lastly, separating the smaller and weaker yeast-cells by drawing them off from the sediment of stronger and heavier yeast-cells.

In the accompanying drawings, Figure 1 represents a vertical central section of one form of the apparatus employed for carrying out my improved process of purifying brewers' yeast. Fig. 2 is a horizontal section of the same on line 2 2, Fig. 1.

Similar letters of reference indicate corresponding parts.

In carrying out my improved process of purifying brewers' yeast a cylindrical vessel A, that is made of wood, copper, or other suitable material, is provided with a funnel-shaped bottom B, that terminates in a neck C, which is provided with a stop-cock D for opening or closing the same. Two branch pipes $d\ d$ enter the neck C above the stop-cock D and are connected with a pipe $e$, through which air may be conducted into the neck and the interior part of the vessel A. The pipe $e$ is provided with a suitable cock or valve $e'$. The vessel A is provided at its upper end with an overflow-pipe $f$ and in its side with a series of drain-cocks $g$, which are arranged one below the other. The vessel A is also provided with a gage-glass $h$, by which the height of the liquid in the same may be readily observed. In the vessel A is supported in suitable neck and step bearings $E^3$ $E^4$ a vertical stirrer-shaft E, that is provided at its upper end with a crank-handle E' and at its lower part with agitating-arms $E^2$. The yeast is transferred to the vessel A and mixed thoroughly with a quantity of water by agitating the stirrer-blades $E^2$. The body of yeast is then subjected to the purifying action of air admitted through the branch pipes $d\ d$ at the lower part of the vessel A and forced from the bottom upward through the entire body of liquid in the vessel A. As the air is introduced under pressure into the lower part of the vessel A, it is forced through the body of yeast and produces the thorough agitation of the same in upward direction, so that the bacteria are oxidized and killed and carried with the weak and degenerated yeast-cells in upward direction, they being passed off through the overflow-pipe $f$. After the body of yeast is thoroughly washed and purified in this manner the supply of air is shut off and the contents of the vessel are permitted to settle by subsidence, so that the heavy impurities contained in the liquid are dropped to the bottom and collected in the neck C, while next above the same a sediment of pure, strong, and heavy yeast-cells is formed, which cells range themselves in layers, according to the different specific gravities of the cells. The cock D is then opened for a short time, so as to drain off the heavy impurities from the neck, after which the drain-cocks $g$ are successively opened by starting with the upper one and continuing in downward direction, so as to draw off gradually the lighter and weaker yeast-cells from the upper part of the vessel, while the yeast-cells remaining in the vessel are of good, strong, and healthy quality and can be kept for any length of time, if properly treated. This remaining body of yeast is then drawn off through the cock D and forms the most effective part of the yeast. In drawing off the purified yeast through the neck at the bottom of the vessel both the quantity required, as well as the quality of the yeast, are fully within control.

By the process described brewers' yeast of a pure and superior quality is thus obtained without the employment of salicylic acid or other chemicals by the destructive action of the oxidizing air-currents on the bacteria and by the mechanical separation of the weak and degenerated yeast-cells from the sound and heavy yeast-cells by the action of the air-currents and the settling of the yeast-cells by subsidence. During the agitation of the yeast-cells the oxygen of the air exerts, also, a strengthening action on the sound yeast-cells, so that the quality of the yeast is considerably improved.

Having thus described my invention, I claim as new and desire to secure by Letters Patent—

The process herein described of purifying brewers' yeast, which consists of the following steps: first, mixing the body of yeast to be purified with a quantity of water; second, subjecting the liquid to agitation and the oxidizing influence of air-currents admitted to the lower part of said liquid; third, removing the bacteria and the light and degenerated yeast-cells from the upper part of the liquid; fourth, permitting the remaining yeast-cells to settle by subsidence, and, lastly, separating the smaller and weaker yeast-cells from the stronger and heavier yeast-cells collected at the bottom, substantially as set forth.

In testimony that I claim the foregoing as my invention I have signed my name in presence of two subscribing witnesses.

RUDOLF ALLERT.

Witnesses:
PAUL GOEPEL,
CHARLES SCHROEDER.